(12) United States Patent
Ju et al.

(10) Patent No.: US 11,761,774 B2
(45) Date of Patent: Sep. 19, 2023

(54) METHOD FOR DETERMINING VEHICLE GET-ON-AND-OFF PLACE AND OPERATION SERVER UTILIZING THE SAME

(71) Applicants: Hyundai Motor Company, Seoul (KR); Kia Corporation, Seoul (KR)

(72) Inventors: Younghyun Ju, Yongin-Si (KR); Hyungu Roh, Seongnam-Si (KR); Minwoo Kwak, Seongnam-Si (KR); SungEun Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 9 days.

(21) Appl. No.: 17/243,406

(22) Filed: Apr. 28, 2021

(65) Prior Publication Data

US 2022/0163337 A1 May 26, 2022

(30) Foreign Application Priority Data

Nov. 20, 2020 (KR) .......................... 10-2020-0156616

(51) Int. Cl.
*G01C 21/34* (2006.01)
*G01C 21/36* (2006.01)
(Continued)

(52) U.S. Cl.
CPC ..... *G01C 21/3461* (2013.01); *G01C 21/3423* (2013.01); *G01C 21/3438* (2013.01);
(Continued)

(58) Field of Classification Search
CPC ... G01C 21/3438; G06Q 50/30; G06Q 10/047
See application file for complete search history.

(56) References Cited

U.S. PATENT DOCUMENTS

| 5,209,544 A | * | 5/1993 | Benedetto | ................ | B60J 7/202 |
| | | | | | 296/107.18 |
| 9,562,785 B1 | * | 2/2017 | Racah | .............. | G06Q 10/06315 |

(Continued)

FOREIGN PATENT DOCUMENTS

| EP | 2 941 763 A1 | 11/2015 |
| JP | 2005-134191 A | 5/2005 |

(Continued)

*Primary Examiner* — Redhwan K Mawari
(74) *Attorney, Agent, or Firm* — MORGAN, LEWIS & BOCKIUS LLP

(57) ABSTRACT

A method for determining a vehicle get-on-and-off place includes receiving a first destination and a first origin along with a vehicle call request from a first user terminal, setting first candidate get-on places within a predetermined distance from the first origin and first candidate get-off places within a predetermined distance from the first destination, generating first get-on-and-off pairs by combination of first candidate get-on places and first candidate get-off places, determining a passenger moving time based on the first origin, the first destination, and each entire path, with respect to each in entire paths based on each in first get-on-and-off pairs, determining a vehicle running time based on each entire path, with respect to each in entire paths, and determining a total travel time based on an expected demand, the passenger moving time, and the vehicle running time with respect to each in entire paths.

20 Claims, 4 Drawing Sheets

(51) Int. Cl.
  *G06Q 10/047* (2023.01)
  *G08G 1/00* (2006.01)
  *G06Q 10/0631* (2023.01)
  *G06Q 50/30* (2012.01)

(52) U.S. Cl.
  CPC ..... *G01C 21/3492* (2013.01); *G01C 21/3605* (2013.01); *G06Q 10/047* (2013.01); *G06Q 10/06315* (2013.01); *G06Q 50/30* (2013.01); *G08G 1/202* (2013.01)

(56) References Cited

U.S. PATENT DOCUMENTS

| | | | | |
|---|---|---|---|---|
| 10,846,633 | B2 * | 11/2020 | Magazinik | G06Q 50/32 |
| 2014/0365250 | A1 * | 12/2014 | Ikeda | G06Q 10/02 |
| | | | | 705/5 |
| 2015/0254581 | A1 * | 9/2015 | Brahme | G06Q 10/02 |
| | | | | 705/5 |
| 2016/0247247 | A1 * | 8/2016 | Scicluna | G06Q 50/30 |
| 2016/0248914 | A1 * | 8/2016 | Lacey | H04M 3/42008 |
| 2018/0204158 | A1 * | 7/2018 | Ratti | G06Q 10/06315 |
| 2019/0026671 | A1 * | 1/2019 | Al Falasi | G01C 21/3438 |
| 2019/0033084 | A1 * | 1/2019 | Chen | G06Q 10/047 |
| 2019/0212149 | A1 * | 7/2019 | Ho | G01C 21/3453 |
| 2019/0295014 | A1 * | 9/2019 | Fagnant | G06Q 10/06311 |
| 2020/0104965 | A1 * | 4/2020 | Ramot | G06Q 10/047 |
| 2020/0141741 | A1 * | 5/2020 | Wang | G01C 21/343 |
| 2020/0209851 | A1 * | 7/2020 | Iwamoto | G05D 1/0061 |

FOREIGN PATENT DOCUMENTS

| | | |
|---|---|---|
| JP | 4058058 B2 | 3/2008 |
| JP | 2019-016290 A | 1/2019 |
| JP | 6731006 B2 | 7/2020 |
| KR | 10-2017-0091485 A | 8/2017 |
| KR | 10-1812775 B1 | 1/2018 |
| KR | 10-2018-0067269 A | 6/2019 |
| KR | 10-2019-0070550 A | 6/2019 |
| KR | 10-1993551 B1 | 6/2019 |
| KR | 10-2055119 B1 | 12/2019 |
| KR | 10-2061463 B1 | 12/2019 |
| KR | 10-2125472 B1 | 6/2020 |
| WO | WO 2014/106617 A1 | 7/2014 |
| WO | WO 2017/143815 | 8/2017 |

* cited by examiner

METHOD FOR DETERMINING VEHICLE GET-ON-AND-OFF PLACE AND OPERATION SERVER UTILIZING THE SAME

CROSS-REFERENCE TO RELATED APPLICATION

The present application claims priority to Korean Patent Application No. 10-2020-0156616 filed on Nov. 20, 2020, the entire contents of which is incorporated herein for all purposes by this reference.

BACKGROUND OF THE INVENTION

Field of the Invention

The present invention relates to a method for determining a vehicle get-on-and-off place and an operation server utilizing the same.

Description of Related Art

In a ridesharing service, when a user willing to use a vehicle designates a get-on position, the user may designate the user's current position as the get-on position only in consideration of the user's convenience. Accordingly, the get-on position may be designated in an area where parking and stoppage is prohibited, or in an area where it is difficult for a vehicle to enter. In the instant case, it may cause inconvenience to other vehicles, while the user himself may also experience an obstacle in using the vehicle. The same problem may arise when the user designates such a place to be a destination for get-off place.

Meanwhile, if the get-on place and get-off place are too far from the user's current position and destination, the user willing to use the service may experience discomfort, and the convenience and effectiveness aimed by the ridesharing service may deteriorate.

Accordingly, in operating vehicles for ridesharing, it is important to specify get-on positions and get-off positions for a plurality of users. Furthermore, response time and cost for a new service request may vary according to a path from the get-on position to the get-off position. For example, when an additional service request occurs while a vehicle moves along a moving path based on origins and destinations of current service users, there may be a case where the moving path needs to be modified. In the instant case, time and cost may increase due to the modification of the moving path.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for determining a vehicle get-on-and-off place and an operation server utilizing the same.

A method for determining a vehicle get-on-and-off place includes receiving a first destination and a first origin along with a vehicle call request from a first user terminal, setting a plurality of first candidate get-on places within a predetermined distance from the first origin and a plurality of first candidate get-off places within a predetermined distance from the first destination, generating a plurality of first get-on-and-off pairs by combination of the plurality of first candidate get-on places and the plurality of first candidate get-off places, determining a first passenger moving time based on the first origin, the first destination, and each entire path, with respect to each in a plurality of entire paths based on each in the plurality of first get-on-and-off pairs, determining a vehicle running time based on each entire path, with respect to each in the plurality of entire paths, and determining a total travel time based on an expected demand, the passenger moving time, and the vehicle running time with respect to each in the plurality of entire paths.

An exemplary method may further include determining the expected demand for each entire path by summing quantities of calls during a running time period of a vehicle with respect to a plurality of links forming each entire path, with respect to each in the plurality of entire paths. The determining of the total travel time may include determining the total travel time by subtracting a value based on the expected demand from a sum of the first passenger moving time and the vehicle running time.

The determining of the passenger moving time may include determining a first passenger moving time based on a pre-get-on walking time from the first origin to a first candidate get-on place, a post-get-off walking time from a first candidate get-off place to the first destination, and a vehicle travel time required for the vehicle to travel from the first candidate get-on place to the first candidate get-off place, with respect to each in the plurality of entire paths.

The determining of the vehicle running time may include determining the vehicle running time based on a cost for the vehicle to travel through the first candidate get-on place and the first candidate get-off place, with respect to each in the plurality of entire paths.

The determining of the total travel time may include determining the total travel time by subtracting a value obtained by multiplying the expected demand by a predetermined weight value from a sum of the first passenger moving time and the vehicle running time, with respect to each in the plurality of entire paths.

An exemplary method may further include selecting a first candidate get-on place and a first candidate get-off place having a minimum total travel time among a plurality of total travel times for the plurality of entire paths, as a first get-on place and a first get-off place.

An exemplary method may further include receiving a second origin and a second destination along with a vehicle call from a second user terminal, setting a plurality of second candidate get-on places within a predetermined distance from the second origin, and setting a plurality of second candidate get-off places within a predetermined distance from the second destination, generating a plurality of second get-on-and-off pairs by combination of the plurality of second candidate get-on places and the plurality of second candidate get-off places, generating a plurality of first entire paths obtained by combination of one of the plurality of first get-on-and-off pairs and one of the plurality of second get-on-and-off pairs, determining a second passenger moving time based on a pre-get-on walking time from the second origin to a second candidate get-on place, a post-get-off walking time from a second candidate get-off place to the second destination, and a vehicle travel time required for the vehicle to travel from the second candidate get-on place to the second candidate get-off place, with respect to each in the plurality of first entire paths, determining the vehicle running time based on a cost for running between the first and second candidate get-on places and the first and second candidate get-off places, with respect to each in the plurality of first entire paths, and estimating expected demand for the entire path by summing quantity of calls for a plurality of links forming the first entire path during a running time period of the vehicle, with respect to each in the plurality of first entire paths. The total travel time may be determined by subtracting a value obtained by multiplying the expected demand by a predetermined weight value from a sum of the first passenger moving time, the second passenger moving time, and the vehicle running time.

The determining of the first passenger moving time, the determining of the vehicle running time, the estimating of the expected demand, and the determining of the total travel time may be performed with respect to each in a plurality of entire paths based on the plurality of first get-on-and-off pairs of one or more other vehicles. The selecting may include selecting a vehicle corresponding to a minimum total travel time from among a plurality of total travel times with respect to the plurality of entire paths of the vehicle and the one or more other vehicles, and selecting the first candidate get-on place and the first candidate get-off place of the minimum total travel time as a first get-on place and a first get-off place.

An exemplary method may further include receiving a second origin and a second destination along with a vehicle call from a second user terminal, setting a plurality of second candidate get-on places within a predetermined distance from the second origin, and setting a plurality of second candidate get-off places within a predetermined distance from the second destination, generating a plurality of second get-on-and-off pairs by combination of the plurality of second candidate get-on places and the plurality of second candidate get-off places, generating a plurality of first entire paths obtained by combination of one of the plurality of first get-on-and-off pairs and one of the plurality of second get-on-and-off pairs, determining a second passenger moving time based on a pre-get-on walking time from the second origin to a second candidate get-on place, a post-get-off walking time from a second candidate get-off place to the second destination, and a vehicle travel time required for the vehicle to travel from the second candidate get-on place to the second candidate get-off place, with respect to each in the plurality of first entire paths, and determine a third passenger moving time based on a pre-get-on walking time from the second origin to the second candidate get-on place, a post-get-off walking time from the second candidate get-off place to the second destination, the vehicle travel time required for the one or more other vehicles to travel from the second candidate get-on place to the second candidate get-off place, with respect to each in the plurality of first entire paths.

An exemplary method may further include determining a first vehicle running time based on a cost for the vehicle to travel through the first and second candidate get-on places and the first and second candidate get-off places, with respect to each in the plurality of first entire paths, determining a second vehicle running time based on a cost for the one or more other vehicles to travel through the first and second candidate get-on places and the first and second candidate get-off places, with respect to each in the plurality of first entire paths, and estimating a first expected demand for the entire path by summing quantities of calls for a plurality of links forming the first entire path during a running time period of the vehicle, with respect to each in the plurality of first entire paths, estimating a second expected demand for the entire path by summing quantities of calls for a plurality of links forming the first entire path during a running time period of the one or more other vehicles, with respect to each in the plurality of first entire paths, determining a first total travel time by subtracting a value obtained by multiplying the first expected demand by a predetermined weight value from a sum of the first passenger moving time, the second passenger moving time, and the first vehicle running time with respect to the vehicle, and determining a second total travel time by subtracting a value obtained by multiplying the second expected demand by a the predetermined weight value from a sum of the first passenger moving time, the third passenger moving time, and the second vehicle running time with respect to the one or more other vehicles.

The determining of the total travel time may include determining the total travel time by subtracting a result of multiplying the expected demand by the predetermined weight value from a sum of the passenger moving time and the vehicle running time, with respect to each in the plurality of entire paths.

An operation server for providing a transportation service upon receiving a first destination and a first origin along with a vehicle call request from a first user terminal, the operation server includes an entire path generation module configured to set a plurality of first candidate get-on places within a predetermined distance from the first origin and a plurality of first candidate get-off places within a predetermined distance from the first destination and to generate a plurality of first get-on-and-off pairs by combination of the plurality of first candidate get-on places and the plurality of first candidate get-off places, a passenger moving time calculation module configured to determine a first passenger moving time based on the first origin, the first destination, and each entire path, with respect to each in a plurality of entire paths based on each in the plurality of first get-on-and-off pairs, a vehicle running time calculation module configured to determine a vehicle running time based on each entire path, with respect to each in the plurality of entire paths, and a total travel time calculation module configured to determine a total travel time based on an expected demand, the passenger moving time, and the vehicle running time with respect to each in the plurality of entire paths.

An exemplary operation server may further include an expected demand calculation module configured to estimate the expected demand for the entire path by summing quantities of calls for a plurality of links forming each entire path during a running time period of the vehicle, with respect to each in the plurality of entire paths. The total travel time calculation module may be configured to determine the total travel time by subtracting a value based on the expected demand from a sum of the passenger moving time and the vehicle running time.

The passenger moving time calculation module may be configured to determine a first passenger moving time based on a pre-get-on walking time from the first origin to a first candidate get-on place, a post-get-off walking time from a first candidate get-off place to the first destination, and a vehicle travel time required for the vehicle to travel from the first candidate get-on place to the first candidate get-off place.

The vehicle running time calculation module may be configured to determine the vehicle running time based on a cost for the vehicle to travel through the first candidate get-on place and the first candidate get-off place, with respect to each in the plurality of entire paths.

The total travel time calculation module may be configured to determine the total travel time by subtracting a value obtained by multiplying the expected demand by a predetermined weight value from a sum of the first passenger moving time and the vehicle running time, with respect to each in the plurality of entire paths.

An exemplary operation server may further include a get-on-and-off place selection module configured to select a first candidate get-on place and a first candidate get-off place having a minimum total travel time among a plurality of total travel times for the plurality of entire paths, as a first get-on place and a first get-off place.

Upon receiving a second origin and a second destination along with a vehicle call from a second user terminal, the entire path generation module may be configured to set a plurality of second candidate get-on places within a predetermined distance from the second origin, set a plurality of second candidate get-off places within a predetermined distance from the second destination, generate a plurality of second get-on-and-off pairs by combination of the plurality of second candidate get-on places and the plurality of second candidate get-off places, and generate a plurality of first entire paths obtained by combination of one of the plurality of first get-on-and-off pairs and one of the plurality of second get-on-and-off pairs, the passenger moving time calculation module may be configured to determine a second passenger moving time based on a pre-get-on walking time from the second origin to a second candidate get-on place, a post-get-off walking time from a second candidate get-off place to the second destination, and a vehicle travel time required for the vehicle to travel from the second candidate get-on place to the second candidate get-off place, with respect to each in the plurality of first entire paths, the vehicle running time calculation module may be configured to determine the vehicle running time based on a cost for running between the first and second candidate get-on places and the first and second candidate get-off places, with respect to each in the plurality of first entire paths, the expected demand calculation module may be configured to estimate the expected demand for the entire path by summing quantities of calls for a plurality of links forming the first entire path during a running time period of the vehicle, with respect to each in the plurality of first entire paths, and the total travel time calculation module may be configured to determine the total travel time by subtracting a value obtained by multiplying the expected demand by a predetermined weight value from a sum of a first passenger moving time, the second passenger moving time, and the vehicle running time.

With respect to each in a plurality of entire paths based on the plurality of first get-on-and-off pairs of one or more other vehicles, an exemplary operation server may determine the total travel time by determining the first passenger moving time, the vehicle running time, and the expected demand, select a vehicle corresponding to a minimum total travel time from among a plurality of total travel times with respect to the plurality of first get-on-and-off pairs of the vehicle and the one or more other vehicles, and select the first candidate get-on place and the first candidate get-off place of the minimum total travel time as a first get-on place and a first get-off place.

Upon receiving a second origin and a second destination along with a vehicle call from a second user terminal, the entire path generation module may be configured to set a plurality of second candidate get-on places within a predetermined distance from the second origin, set a plurality of second candidate get-off places within a predetermined distance from the second destination, generate a plurality of second get-on-and-off pairs by combination of the plurality of second candidate get-on places and the plurality of second candidate get-off places, and generate a plurality of first entire paths obtained by combination of one of the plurality of first get-on-and-off pairs and one of the plurality of second get-on-and-off pairs, and the passenger moving time calculation module may be configured to determine a second passenger moving time based on a pre-get-on walking time from the second origin to the second candidate get-on place, a post-get-off walking time from the second candidate get-off place to the second destination, and the vehicle travel time required for the vehicle to travel from the second candidate get-on place to the second candidate get-off place, with respect to each in the plurality of first entire paths, and to determine a third passenger moving time based on a pre-get-on walking time from the second origin to the second candidate get-on place, a post-get-off walking time from the second candidate get-off place to the second destination, the vehicle travel time required for the one or more other vehicles to travel from the second candidate get-on place to the second candidate get-off place.

The vehicle running time calculation module may be configured to determine a first vehicle running time based on a cost for the vehicle to travel through the first and second candidate get-on places and the first and second candidate get-off places, with respect to each in the plurality of first entire paths, and to determine a second vehicle running time based on a cost for the one or more other vehicles to travel through the first and second candidate get-on places and the first and second candidate get-off places. The expected demand calculation module may be configured to estimate a first expected demand for the entire path by summing quantities of calls for a plurality of links forming the first entire path during a running time period of the vehicle, with respect to each in the plurality of first entire paths, and to estimate a second expected demand for the entire path by summing quantities of calls for a plurality of links forming the first entire path during a running time period of the one or more other vehicles, with respect to each in the plurality of first entire paths. The total travel time calculation module may be configured to determine a first total travel time by subtracting a result of multiplying the first expected demand by the predetermined weight value from a sum of the first passenger moving time, the second passenger moving time, and the first vehicle running time with respect to the vehicle, and to determine the second total travel time by subtracting a result of multiplying the second expected demand by the predetermined weight value from a sum of the first passenger moving time, the third passenger moving time, and the second vehicle running time with respect to the one or more other vehicles.

The total travel time calculation module may be configured to determine the total travel time by subtracting a result of multiplying the expected demand by the predetermined weight value from a sum of the passenger moving time and the vehicle running time, with respect to each in the plurality of entire paths.

An exemplary operation server may further include a database configured to store quantity of calls during a running time period of the vehicle with respect to the plurality of links.

Various aspects of the present invention provide a method for determining a vehicle get-on-and-off place and an operation server utilizing the same.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
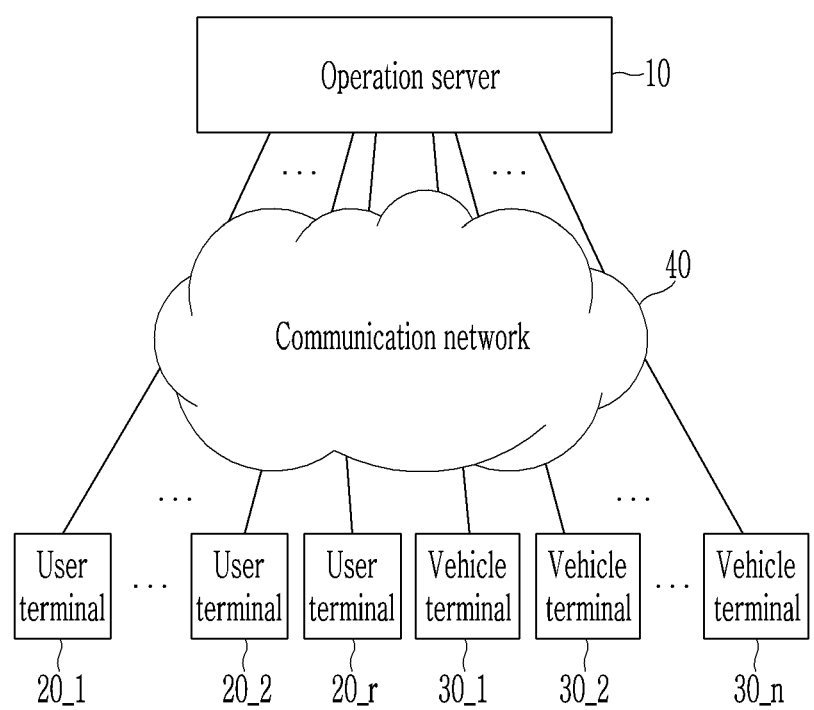
FIG. 1 illustrates a passenger transportation service system according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments included in the present specification will be described in detail with reference to the accompanying drawings. In the present specification, the same or similar components will be denoted by the same or similar reference numerals, and a repeated description thereof will be omitted. Terms "module" and/or "unit" for components used in the following description are used only to easily describe the specification. Therefore, these terms do not have meanings or roles that distinguish them from each other in and of themselves. In describing exemplary embodiments of the present specification, when it is determined that a detailed description of the well-known art associated with the present invention may obscure the gist of the present invention, it will be omitted. The accompanying drawings are provided only to allow exemplary embodiments included in the present specification to be easily understood and are not to be interpreted as limiting the spirit included in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. Furthermore, it is to be understood that when one component is referred to as being "directly connected" or "directly coupled" to another component, it may be connected or coupled directly to the other component without a further component intervening therebetween.

It will be further understood that terms "comprise" and "have" used in the present specification specify the presence of stated features, numerals, steps, operations, components, parts, or combinations thereof, but do not preclude the presence or addition of one or more other features, numerals, steps, operations, components, parts, or combinations thereof.

Furthermore, the terms "-er", "-or", and "module" described in the specification mean units for processing at least one function and operation, and may be implemented by hardware components or software components, and combinations thereof.

FIG. 1 illustrates a passenger transportation service system according to an exemplary embodiment of the present invention.

A passenger transportation service system 1 includes an operation server 10, user terminals 20_1 to 20_r, and vehicle terminals 30_1 to 30_n. Here, r and n are natural numbers greater than or equal to 1.

Each of the vehicles providing the passenger transportation service is provided with a vehicle terminal, and FIG. 1 illustrates that n vehicles are providing the passenger transportation service, and r user terminals may generate a vehicle call request, i.e., a request for calling a vehicle. Hereinafter, for convenience of description, when a feature applicable to any user terminal is described, the user terminal is referred to by the reference numeral 20, and when a feature applicable to any vehicle terminal, the vehicle terminal is referred to by the reference numeral 30, while the reference numeral 20_j is used to indicate a specific user terminal and the reference numeral 30_i is used to indicate a specific vehicle terminal.

Transmission and reception of information between the user terminal 20 and the operation server 10 and transmission and reception of information between the vehicle terminal 30 and the operation server 10 may be conducted through a communication network 40.

A user (hereinafter, also called a passenger) willing to use the passenger transportation service may input information associated to a destination and position information related to the user into the user terminal 20, and the user terminal 20 may transmit the input data to the operation server 10. The position information related to the user may be based on a currently recognized position utilizing a global positioning system (GPS) of the user terminal 20. Alternatively, the position information related to the user may be information associated with a position which the user specifies through the user terminal 20.

The user terminal 20 may be inputted with a vehicle call, a destination, and an origin from the passenger, and may transmit the destination and the origin together with notification of the vehicle call to the operation server 10. The origin may be a current position of the user terminal 20, and the current position may be recognized using the Global Positioning System (GPS) of the user terminal 20. Furthermore, the user terminal 20 may transmit the number of passengers, etc. along with the origin and the destination to the operation server 10.

The user terminal 20 may receive information related to a get-on place and a get-off place from the operation server 10. The user terminal 20 may receive information from the operation server 10, such as a vehicle identification number, a vehicle driver's contact information, an expected arrival time of the vehicle to the get-on place (hereinafter, an expected get-on time), an expected arrival time of the vehicle to the get-off place (hereinafter, an expected get-off time), etc., along with the get-on place and the get-off place.

The user terminal 20 may receive charging information for a transportation service fare from the operation server 10 and pay the fare based on the charging information. The user terminal 20 may receive identification information for identifying a passenger from the operation server 10 through the communication network 40, and may display the identification information on a display of the user terminal 20.

The user terminal 20 may be a smart phone, a laptop, a tablet PC, etc., and an application to use the passenger transportation service may be provided in the user terminal 20. The user terminal 20 may perform the aforementioned operations through the provided application.

The vehicle terminal 30 is provided in each of the vehicles used in the passenger transportation service. The vehicle terminal 30 may transmit a current position of the vehicle to the operation server 10 in real time, and may receive, from the operation server 10, information related to the get-on place and the get-off place with respect to each passenger to use the vehicle and information related to an expected get-on time for each get-on place and an expected get-off time for each get-off place. The vehicle terminal 30 may also receive an identification information for each passenger to use the vehicle from the operation server 10

The identification information for each passenger may be transmitted from the operation server 10 to both of the user terminal 20 of each passenger and the vehicle terminal 30 of the vehicle to be used by each passenger.

The vehicle terminal 30 may be a smart phone, a laptop, a tablet PC, etc., and an application for providing the passenger transportation service may be provided in the vehicle terminal 30. The vehicle terminal 30 may perform the aforementioned operations through the provided application.

The operation server 10 receives information for the origin and the destination from the user terminal 20, and selects, among vehicles configured for providing the passenger transportation service, a vehicle to pass through the get-on place corresponding to the origin received from the user terminal 10 and the get-off place corresponding to the destination. The operation server 10 may reflect service request demand predicted during vehicle movement in selecting vehicle and determining moving path of the vehicle based on the origin and destination of at least one user.

The operation server 10 may transmit the get-on place and the get-off place, the expected get-on time and the expected get-off time, and passenger identification information, to the vehicle terminal 30_*i* (here, i is a natural number from in 1 to n) of the selected vehicle, and to the user terminal 20_*j* (here, j is a natural number from 1 to r) that requested the vehicle call. Furthermore, the operation server 10 may further transmit the vehicle identification number, the vehicle driver's contact information, charging information to the user terminal 20_*j*, and the like.

Furthermore, the user terminal 20 may further perform an operation required to request the passenger transportation service, if applicable. The vehicle terminal 30 may further perform an operation required to provide the passenger transportation service, if applicable. The operation server 10 may provide a further service to the user terminal 20 or the vehicle terminal 30, if applicable. The content described in various exemplary embodiments of the present invention does not limit the application of the technology not described to the present invention. That is, a new service may be provided by combining the present invention with currently known technologies, and the contents described in various exemplary embodiments of the present invention do not limit such variation.

Hereinafter, a method for the operation server 10 to select a get-on place, a get-off place, and a vehicle to pass through the get-on place and get-off place is described in detail.

Figure 2:
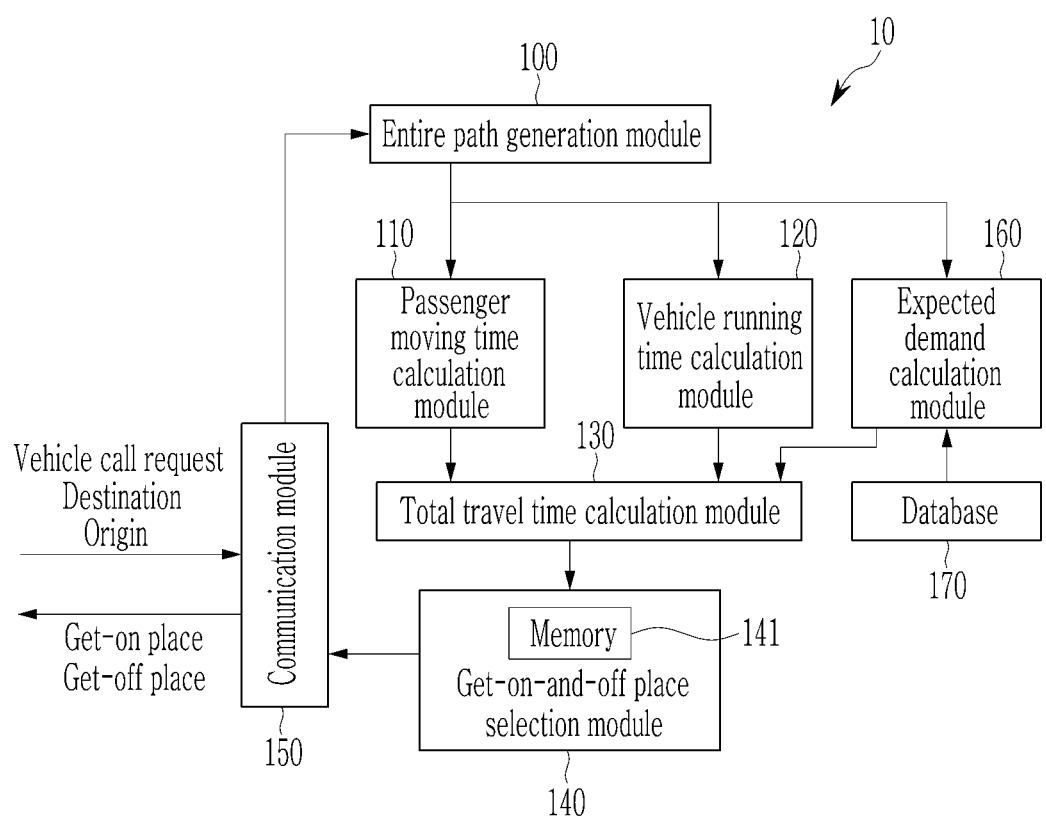
FIG. 2 schematically illustrates an operation server according to an exemplary embodiment of the present invention.

FIG. 2 schematically illustrates an operation server according to an exemplary embodiment of the present invention.

Figure 3:
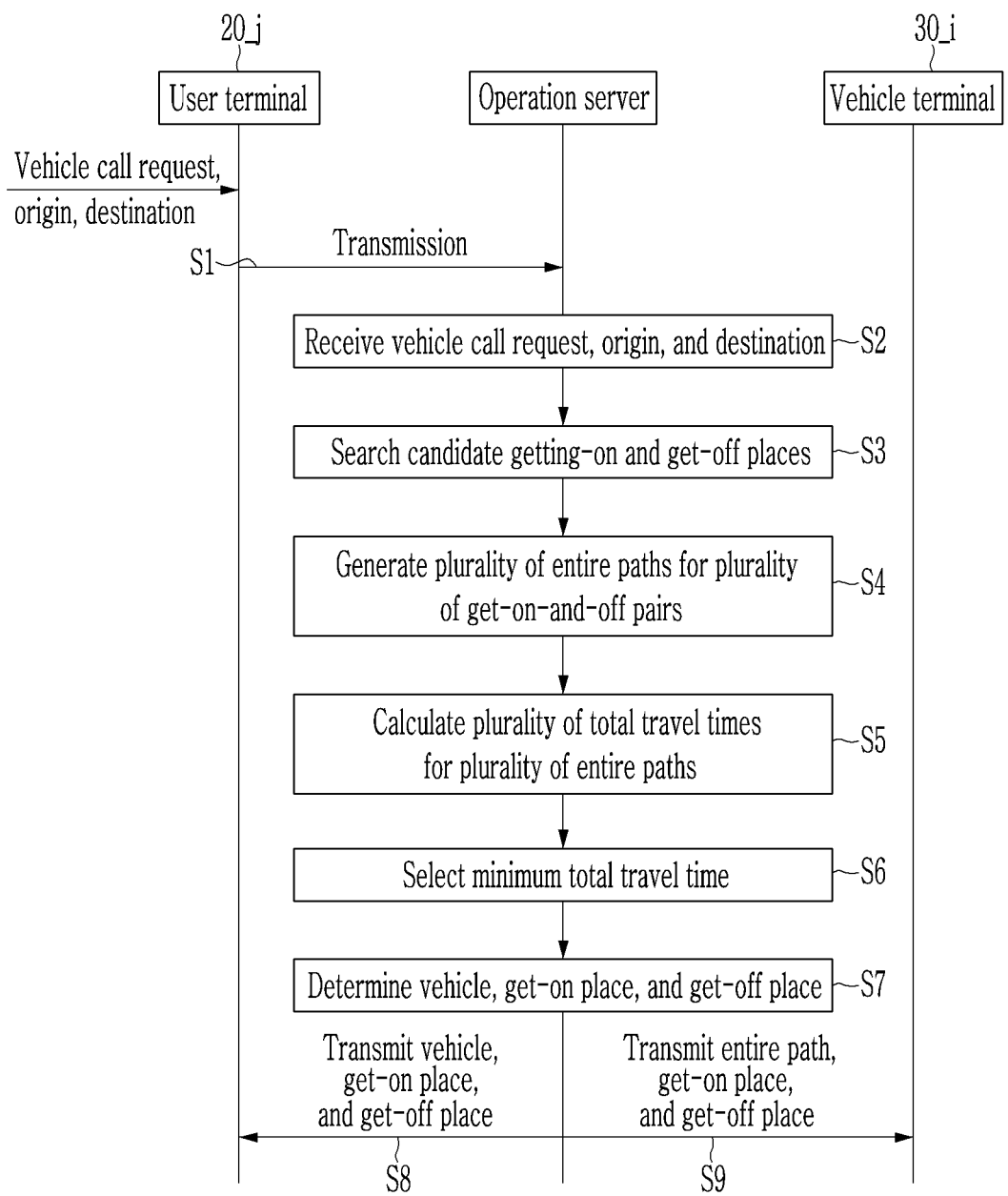
FIG. 3 is a flowchart showing a method for determining a vehicle get-on-and-off place according to an exemplary embodiment of the present invention.

FIG. 3 is a flowchart showing a method for determining a vehicle get-on-and-off place according to an exemplary embodiment of the present invention.

As shown in FIG. 2, the operation server 10 includes an entire path generation module 100, a passenger moving time calculation module 110, a vehicle running time calculation module 120, a total travel time calculation module 130, a get-on-and-off place selection module 140, and a communication module 150.

First at step S1, the user terminal 20 receives the vehicle call request from the passenger along with the origin and the destination, and transmits the vehicle call request to the operation server 10 along with information for the origin and the destination.

Subsequently at step S2, the communication module 150 of the operation server 10 receives the origin, the destination, and the vehicle call request from the user terminal 20.

Subsequently at step S3, the entire path generation module 100 of the operation server 10 searches for a candidate get-on place and a candidate get-off place for get-on and get-off around the origin and the destination. The entire path generation module 100 may search for the candidate get-on place within a predetermined distance from the origin based on a straight-line distance, a walking distance, a walking time, and the like from the origin to the candidate get-on-and-off place, and may search for the candidate get-off place within a predetermined distance with respect to the destination based on a straight-line distance, a walking distance, a walking time, and the like to the destination. The operation server 10 may preset the candidate get-on-and-off places for every point of a service area for the transportation service, in consideration of distances from each point to get-on-and-off points where the vehicle may stop. Among a plurality of candidate get-on-and-off places, the operation server 10 finds the candidate get-on-and-off places close to the origin as the candidate get-on places, and finds the candidate get-on-and-off places close to the destination as the candidate get-on places.

At step S4, the entire path generation module 100 generates a plurality of get-on-and-off pairs by combining each in a plurality of candidate get-on places and each in a plurality of candidate get-off places, and generates an entire path for each in the plurality of get-on-and-off pairs. At the instant time, when two or more user terminals are involved, the entire path generation module 100 finds, based on the origin and the destination received from each user terminal, a plurality of candidate get-on places and a plurality of candidate get-off places, generates a plurality of get-on-and-off pairs for each user terminal, and selects one from the plurality of get-on-and-off pairs for each user terminal, to generate an entire path with respect to a plurality of user terminals. The entire path generation module 100 generates a plurality of entire paths for all combinations available by selecting one from the plurality of get-on-and-off pairs for each in the plurality of user terminals. Furthermore, when a plurality of vehicles is available for the transportation service, the entire path generation module 100 generates the plurality of entire paths with respect to each in the plurality of vehicles in the same way as described above.

At step S5, the operation server 10 determines a plurality of total travel times for the plurality of entire paths. The total travel time may be determined in consideration of a first walking distance from the origin to the candidate get-on place, a second walking distance from the candidate get-off place to the destination, a first walking time required to walk the first walking distance, a second walking time required to walk the second walking distance, a vehicle travel time for the vehicle to move from the origin to the destination, the passenger's preference based on the passenger's profile and the situation in which the transportation service is provided, the vehicle running time, an existing passenger's detour cost in the case that shared ride is available, an expected demand of each in a plurality of links included in each entire path, and the like. Each entire path includes the plurality of links, where the link is a basic unit that forms the entire path. For example, a road, an intersection, and the like between an intersection and another intersection adjacent to the intersection may be a link. Furthermore, when a plurality of vehicles is available for the transportation service, the operation server 10 determines the plurality of total travel times for each in the plurality of vehicles in the same way as described above.

The passenger moving time calculation module 110 determines a passenger moving time for each in the plurality of entire paths. The passenger moving time calculation module 110 determines a plurality of passenger moving times for all the plurality of entire paths by use of map information and traffic situation information, and the like. The passenger moving time includes a first walking distance from the origin to the candidate get-on place, the second walking distance from the candidate get-off place to the destination, the first walking time required to walk the first walking distance, the second walking time required to walk the second walking distance, and the vehicle travel time from the candidate get-on place to the candidate get-off place. When a plurality of vehicle call requests, a plurality of origins, and a plurality of destinations are received from the plurality of user terminals, the passenger moving time calculation module 110 determines the passenger moving time for each in the plurality of user terminals, and determines the passenger moving time with respect to the one entire path by summing the plurality of passenger moving times with respect to the plurality of user terminals, according to one in the plurality of entire paths. Furthermore, when a plurality of vehicles is available for the transportation service, the passenger moving time calculation module 110 determines the plurality of passenger moving times for each in the plurality of vehicles in the same way as described above.

The vehicle running time calculation module 120 determines the vehicle running time in consideration of the total running time, fuel cost, and the like of the vehicle for each in the plurality of entire paths. The vehicle running time corresponds to a running cost of the vehicle, and the vehicle running time calculation module 120 may generate the vehicle running time by converting the vehicle running cost for each in the plurality of entire paths to time. The vehicle running time calculation module 120 may determine a plurality of vehicle running times with respect to all of the plurality of entire paths. For example, the vehicle running time calculation module 120 may determine the vehicle running time by adding the total running time for which the vehicle travels to provide the transportation service to the time converted from the fuel consumed by running of the vehicle, with respect to one of the plurality of entire paths. Furthermore, when a plurality of vehicles is available for the transportation service, the vehicle running time calculation module 120 determines the plurality of vehicle running times for each in the plurality of vehicles in the same way as described above.

In determining the total travel time, in the case that a shared ride of the vehicle is available, the operation server 10 may consider a detour time of the existing passengers and a detour time according to the detour distance, according to the addition of the candidate get-on place and the candidate get-off place. The passenger moving time calculation module 110 adds all of a plurality of vehicle travel times according to the plurality of vehicle call requests, through which the detour time of the existing passengers due to shared riding may be reflected. All the vehicle travel time for each passenger are summed in determining the passenger moving time. However, the vehicle actually travels according to the entire path, and therefore, the result of sum of all the vehicle travel time for each passenger may be different from an actual travel time for the vehicle travel to transport the passengers. That is, in the passenger moving time, there is a time overlap between the vehicle travel time for each passenger. As the number of passengers increases due to shared riding, the number of the vehicle travel times increases in determining the passenger moving time, resulting in more time overlap. Through this, the detour time, the detour distance, and the like of the existing passengers may be reflected in the passenger moving time.

The expected demand calculation module 160 may determine, with respect to each in the plurality of entire paths, the expected demand by summing a quantity of expected calls for links forming an entire path.

The operation server 10 may further include a database 170 that stores data associated to quantity of calls by time with respect to each in the plurality of links forming an entire area where the service is provided. The expected demand calculation module 160 may sum the quantity of calls for each link while the vehicle is moving along each entire path, and determine the expected demand for each entire path.

The total travel time calculation module 130 may determine the total travel time in consideration of situation in which the transportation service is provided, the passenger's preference based on the passenger's profile, and expected demand along with the passenger moving time and the vehicle running time for each in the plurality of entire paths. The situation in which the transportation service is provided includes the day of the week, time, weather, and the like, and the passenger's profile includes the gender, age group of the passenger, and the like. For example, the total travel time calculation module 130 may set a higher preference for the candidate get-on place and the candidate get-off place which may provide a shorter walking time or availability of moving through buildings in rainy weather, and may set a higher preference for the candidate get-on place and the candidate get-off place on a wider street in the case of a female passenger during the late night. The higher the preference, the higher the weight value for the factor in determining the total travel time. The total travel time calculation module 130 may subtract the result of multiplying the expected demand for each entire path by the weight value from the total travel time. The weight value is a factor that determines how much to reflect the expected demand.

Furthermore, when a plurality of vehicles is available for the transportation service, the total travel time calculation module 130 determines the plurality of total travel times with respect to each in the plurality of vehicles in the same way as described above.

At step S6, the get-on-and-off place selection module 140 of the operation server 10 may select a minimum total travel time from among the plurality of total travel times with respect to the plurality of entire paths of the plurality of vehicles. The get-on-and-off place selection module 140 includes a memory 141, and stores the plurality of total travel times with respect to the plurality of entire paths with respect to each in the plurality of vehicles in the memory 141. The get-on-and-off place selection module 140 selects the minimum total travel time from among all the plurality of total travel times with respect to the plurality of vehicles stored in the memory 141.

At step S7, the get-on-and-off place selection module 140 finally determines, a vehicle to run an entire path corresponding to the selected total travel time, the candidate get-on place included in the corresponding entire path, and the candidate get-off place included in the corresponding entire path, as the vehicle to transport the passenger, the get-on place for each passenger to get on the vehicle, and the get-off place for each passenger to get off the vehicle.

At step S8, the communication module 150 may transmit the vehicle determined by the get-on-and-off place selection module 140, each get-on place, and each get-off place, to each user terminal 20_j. Accordingly, at step S9, the communication module 150 may transmit information related to the entire path and the get-on place and get-off place for each passenger to the vehicle terminal 30_i of the determined vehicle.

The modules introduced in the operation server 10 may mean a logical portion of a program executed by the operation server 10 to perform a specific function, which may be stored in the memory the operation server 10, and may be processed by a processor of the operation server 10. Such modules may be realized as software or a combination of software. The memory of the operation server 10 stores data related to information, and may include various types of memories such as a high-speed random access memory, a magnetic disk storage device, a flash memory device, and non-volatile memory such as a non-volatile solid-state memory device, and the like.

There may be two or more passengers using the vehicle in one instance of the vehicle call. Even if two or more passengers use the vehicle through the vehicle call request received from one user terminal 20, the two or more passengers move along the same path. Therefore, the number of passengers using the vehicle through one vehicle call does not affect the passenger moving time. However, since the number of people who may ride the vehicle is limited, the number of passengers which may use the vehicle through the one vehicle call may be limited.

The number of passengers who actually get on the vehicle may not be identical to the number of the vehicle call requests. That is, the number of passengers using the vehicle by the one vehicle call request may be two or more. Hereinafter, it will be described that "passenger" and "the vehicle call request" correspond to each other 1:1. That is, although there may be several passengers who use the vehicle by one vehicle call request, the term "passenger" hereinbelow refers to one representative passenger who actually requested the vehicle call, rather than all passengers getting on the vehicle. Furthermore, each passenger may have one origin and one destination.

Hereinafter, a method for determining the total travel time by the operation server is described in detail with reference to a specific example. As described above, the total travel time is the cost for each vehicle with respect to one entire path which may transport all passengers. Therefore, when the number of cases of the entire paths is m, m total travel times are determined. Since the entire path may be derived differently for each vehicle, the operation server determines n*m quantity of total travel times in total, where n is the number of entire vehicles, and may determine the get-on place and the get-off place for each vehicle and each passenger by selecting a smallest total travel time.

The entire path generation module 100 sets the plurality of get-on-and-off pairs $(a\_1, c\_1), \ldots, (a\_1, c\_d), \ldots, (a\_b, c\_1), \ldots,$ and $(a\_b, c\_d)$ from combinations of the candidate get-on places $(a\_1, \ldots, a\_b)$ and the candidate get-off places $(c\_1, \ldots, c\_d)$ for each passenger, where b and d are natural numbers greater than or equal to 1. In the case of two or more passengers, the entire path generation module 100 may select one in the plurality of get-on-and-off pairs for each in all passengers, and may generate one entire path for all passengers by combination of the selected get-on-and-off pairs in consideration of get-on-and-off sequence for the get-on place and the get-off place of each passenger. The operation server 10 may select one in the plurality of get-on-and-off pairs for each in all passengers, and may generate the plurality of entire paths for all derivable cases in consideration of get-on-and-off sequence for the get-on place and the get-off place of each passenger. For example, although there may be e passengers and the quantity of the plurality of get-on-and-off pairs may be different for each passenger, for convenience of the description, it is supposed that the plurality of get-on-and-off pairs with respect to each passenger is in a quantity of f. Accordingly, the number of cases of all entire paths for all passengers becomes e!*fe. That is, the operation server 10 may determine the total travel time with respect to each of the entire paths in the quantity of e!*fe. When there is only one passenger, the number of cases for the entire paths is f.

The total travel time calculation module 130 may receive the passenger moving time, the vehicle running time, and the expected demand for each in the plurality of entire paths from the passenger moving time calculation module 110, the vehicle running time calculation module 120, and the expected demand calculation module 160, and then may determine the total travel time by use of equation 1 shown below. In equation 1, a detour cost for the shared riding passenger is not included explicitly, but such is reflected in $$\sum_{g=1}^{h} \text{passenger moving time.}$$

That is, when there exists a shared riding passenger, the entire path is changed, and an overlapping time between the vehicle travel times of all passengers increases according to the changed entire path, from which the detour cost according to the path change may be reflected.

$$\text{total travel time} = \sum_{g=1}^{h} \text{passenger moving time} +$$
$$(\text{vehicle running time} * \alpha) - (\text{expected demand} * w) \quad \text{[equation 1]}$$

In equation 1, h means the total number of passengers, and g is a variable indicating each in the all passengers. The vehicle running time calculation module 120 applies, to equation 1, the time to transport all passengers in the vehicle, the vehicle running time based on the cost, and the expected demand according to each in the plurality of entire paths. That is, in various exemplary embodiments of the present invention, the vehicle running cost is converted into time according to the unit of the total travel time. Here, $\alpha$ is a weight value that considers the relative importance between passenger convenience and running cost reduction. For example, when the proportion of passenger convenience is relatively increased, the total travel time calculation module 130 may adjust a to be less than 1, and when the proportion of running cost reduction is relatively increased, the total travel time calculation module 130 may adjust a to be greater than 1. Furthermore, the vehicle running time calculation module 120 may adjust the $\alpha$ value according to an increase or decrease in fuel cost per unit time. For example, the vehicle running time calculation module 120 may increase the $\alpha$ value when fuel cost per unit time increases, and decrease the a value when fuel cost per unit time decreases.

Furthermore, w is a weight factor indicating a level of reflecting the expected demand. That is, the weight value w is determined according to the ratio by which the passenger's walking travel time, the vehicle's running time, and the expected demand versus the vehicle's running cost are reflected in the total travel time. For example, the higher the degree of reflection of expected demand, the larger the weight value w, and thus the total travel time decreases relatively much. Conversely, as the degree of reflection of expected demand is lower, the weight value w has a smaller value, and the total travel time decreases relatively less. The passenger moving time calculation module 110 determines the passenger moving time for each passenger by use of equation 2.

$$\text{passenger moving time} = (\text{walking time} * \beta) + \text{vehicle travel time} \quad \text{[equation 2]}$$

In equation 2, the walking time is the sum of the walking time for a passenger to walk from the origin to the candidate get-on place and the time to walk from the candidate get-off place to the destination. The vehicle travel time is the time required for a corresponding passenger to travel from the candidate get-on place to the candidate get-off place. Here, $\beta$ is a weight value for walking time, which is 1 by default, but may vary depending on the situation in which the transportation service is provided. For example, on a rainy day, passengers tend to prefer get-on and get-off places closer to the origin and the destination, even if the travel time is longer. In the instant case, the passenger moving time calculation module 110 adjusts the weight value $\beta$ for the walking time to a value greater than 1. Accordingly, since the total travel time relatively decreases as the walking time becomes shorter, the get-on place and the get-off place having a shorter walking time are more likely to be selected.

The passenger moving time calculation module 110 may consider the passenger's profile in determining $\beta$. For example, when a passenger is a female and utilizes a vehicle at late night, in consideration of safety, preference for the candidate get-on place and the candidate get-off place on broad street is high. At the instant time, the passenger moving time calculation module 110 may reduce $\beta$ for the candidate get-on place and the candidate get-off place on the broad street.

Figure 4:
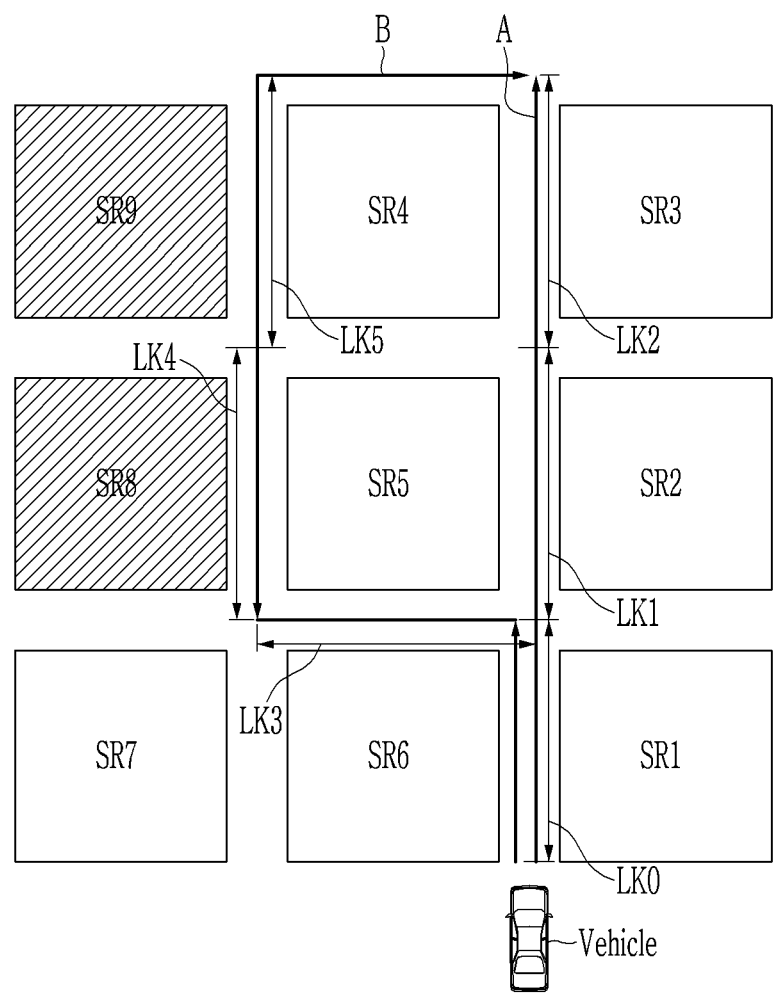
FIG. 4 illustrates reflecting of expected demand according to an exemplary embodiment of the present invention.

FIG. 4 illustrates reflecting of expected demand according to an exemplary embodiment of the present invention.

FIG. 4 illustrates a path A and a path B through which the vehicle is moving from the origin to the destination of the passenger. The paths A and B may be one of the plurality of entire paths available by combination, or a portion of the one of the plurality of entire paths. It is supposed that areas SR8 and SR9 (shadowed areas) among the service areas SR1 to SR9 are areas where service demand is high during the time when the vehicle will be operated, and areas SR2 and SR3 are areas with low service demand during that time period. It is assumed that the service demand of the remaining service areas is the same.

The path A includes links LK0, LK1, and LK2, and the path B includes links LK0, LK3, LK4, and LK5. Links LK4 and LK5 are links adjacent to areas with high service demand during that time period, and the quantity of calls to the links LK4 and LK5 stored in database 170 is high. Conversely, links LK1 and LK2 are links adjacent to regions with low service demand during that time period, and the quantity of calls to the links LK1 and LK2 stored in database 170 is low.

When the entire path is the path A, the expected demand calculation module 160 may determine the expected demand for the path A by summing the quantity of calls for the links LK0 to LK2 during that time period stored in the database 170. When the entire path is the path B, the expected demand calculation module 160 may determine the expected demand for the path B by summing the quantity of calls for the link LK0 and LK3 to LK5 during that time period stored in the database 170.

The path A has smaller number of links relatively to the path B, and thus, may have a shorter passenger moving time and a shorter vehicle running time. At the instant time, links LK4 and LK5 are links adjacent to areas with high demand, and links LK1 and LK2 are links adjacent to areas with low demand. Therefore, the expected demand according to the path B may be greater than the expected demand according to the path A, and the total travel time in the path B determined according to equation 1 may be shorter than the total travel time in the path A.

Even when the origin and the destination of an additional passenger are added while the vehicle is running in the entire path determined according to the origin and destination of existing passengers, the expected demand may be reflected in the total travel time in the manner described above.

When the origin and the destination are added, the entire path generation module 100 sets the plurality of get-on-and-off pairs (a_1, c_1), . . . , (a_1, c_d), . . . , (a_b, c_1), . . . , and (a_b+1, c_d+1) by combination of the candidate get-on places (a_1, . . . , a_b, a_b+1) and the candidate get-off places (c_1, . . . , c_d, c_d+1) with respect to each in all passengers including the added passenger, where b and d are natural numbers greater than or equal to 1. The entire path generation module 100 may select one in the plurality of get-on-and-off pairs for each in all passengers, and may generate one entire path for all passengers by combination of the selected get-on-and-off pairs in consideration of get-on-and-off sequence for the get-on place and the get-off place of each passenger.

The total travel time calculation module 130 receives the passenger moving time, the vehicle running time, and the expected demand for each in the plurality of entire paths from the passenger moving time calculation module 110, the vehicle running time calculation module 120, and expected demand calculation module 160, and determines the total travel time according to equation 1.

Accordingly, the operation server 10 according to various exemplary embodiments of the present invention may determine the total travel time in consideration of expected demand before or during operation of the vehicle.

The total travel time calculation module 130 determines the total travel time according to equation 1, and determines the total travel time for all cases of entire paths. Furthermore, when a plurality of vehicles is available for the transportation service, the total travel time is determined for all cases of entire paths, with respect to each in all vehicles. The total travel time calculation module 130 determines the plurality of total travel times with respect to the plurality of entire paths, for all vehicles.

The get-on-and-off place selection module 140 selects a minimum value from among all of the plurality of total travel times determined by the total travel time calculation module 130. The operation server 10 may transmit information to the user terminal 20_j and the vehicle terminal 30_i of the corresponding vehicle through the communication module 150.

In the passenger transportation service, various factors such as distances from and to the origin and the destination, a walking time, the situation in which the transportation service is provided, the user profile, and the like are considered in selecting get-on-and-off points of the passengers, and therefore, convenient and safe get-on-and-off of the vehicle may be available for the passengers. At the same time, vehicle travel cost is also considered and therefore, cost may be minimized from the standpoint of providing the transportation service. In the case of the transportation service where shared riding is available, the existing passenger's detour cost is also considered, so that the inconvenience of shared riding may be minimized from the standpoint of the existing passenger.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for determining a vehicle get-on-and-off place performed by a processor of an operation server configured to execute a program stored by a memory, the method comprising:
   receiving, by the operation server, a first destination and a first origin along with a vehicle call request from a first user terminal;
   setting, by the processor, a plurality of first candidate get-on places within a predetermined distance from the first origin and a plurality of first candidate get-off places within a predetermined distance from the first destination;
   generating, by the processor, a plurality of first get-on-and-off pairs by combination of the plurality of first candidate get-on places and the plurality of first candidate get-off places;
   determining, by the processor, a first passenger moving time based on the first origin, the first destination, and each entire path, with respect to each in a plurality of entire paths based on each in the plurality of first get-on-and-off pairs;
   determining, by the processor, a vehicle running time based on each entire path, with respect to each in the plurality of entire paths;
   determining, by the processor, a total travel time based on an expected demand, the first passenger moving time, and the vehicle running time with respect to each in the plurality of entire paths; and
   determining, by the processor, the expected demand for each entire path by summing quantities of calls during a running time period of a vehicle with respect to a plurality of links forming each entire path, with respect to each in the plurality of entire paths,
   wherein the determining of the total travel time includes determining the total travel time by subtracting a value based on the expected demand from a sum of the first passenger moving time and the vehicle running time, and
   wherein the determining of the first passenger moving time includes:
   determining the first passenger moving time based on a pre-get-on walking time from the first origin to a first candidate get-on place, a post-get-off walking time from a first candidate get-off place to the first destination, and a vehicle travel time required for the vehicle to travel from the first candidate get-on place to the first candidate get-off place, with respect to each in the plurality of entire paths.

2. The method of claim 1, wherein the determining of the vehicle running time includes:
   determining the vehicle running time by converting a running cost for the vehicle to travel through the first candidate get-on place and the first candidate get-off place to time, with respect to each in the plurality of entire paths.

3. The method of claim 2, wherein the determining of the total travel time further includes:
   determining the total travel time by subtracting a value obtained by multiplying the expected demand by a predetermined weight value from the sum of the first passenger moving time and the vehicle running time, with respect to each in the plurality of entire paths.

4. The method of claim 1, further including:
   selecting, by the processor, a first candidate get-on place and a first candidate get-off place having a minimum total travel time among a plurality of total travel times for the plurality of entire paths, as a first get-on place and a first get-off place.

5. The method of claim 4, further including:
   receiving, by the processor, a second origin and a second destination along with a vehicle call from a second user terminal;
   setting, by the processor, a plurality of second candidate get-on places within a predetermined distance from the second origin, and setting a plurality of second candidate get-off places within a predetermined distance from the second destination;
   generating, by the processor, a plurality of second get-on-and-off pairs by combination of the plurality of second candidate get-on places and the plurality of second candidate get-off places;

generating, by the processor, a plurality of first entire paths obtained by combination of one of the plurality of first get-on-and-off pairs and one of the plurality of second get-on-and-off pairs;

determining, by the processor, a second passenger moving time based on a pre-get-on walking time from the second origin to a second candidate get-on place, a post-get-off walking time from a second candidate get-off place to the second destination, and a vehicle travel time required for a vehicle to travel from the second candidate get-on place to the second candidate get-off place, with respect to each in the plurality of first entire paths;

determining, by the processor, the vehicle running time based on a cost for running between the first and second candidate get-on places and the first and second candidate get-off places, with respect to each in the plurality of first entire paths; and estimating, by the processor, expected demand for the entire path by summing quantity of calls for a plurality of links forming a first entire path during a running time period of the vehicle, with respect to each in the plurality of first entire paths, wherein the total travel time is determined by subtracting a value obtained by multiplying the expected demand by a predetermined weight value from a sum of the first passenger moving time, the second passenger moving time, and the vehicle running time.

6. The method of claim 1, wherein the determining of the first passenger moving time, the determining of the vehicle running time, the estimating of the expected demand, and the determining of the total travel time are performed with respect to each in a plurality of entire paths based on the plurality of first get-on-and-off pairs of one or more other vehicles, and wherein the method further includes:
  selecting, by the processor, a vehicle corresponding to a minimum total travel time from among a plurality of total travel times with respect to the plurality of entire paths of the vehicle and the one or more other vehicles; and
  selecting, by the processor, a first candidate get-on place and a first candidate get-off place of the minimum total travel time as a first get-on place and a first get-off place.

7. The method of claim 6, further including:

receiving, by the processor, a second origin and a second destination along with a vehicle call from a second user terminal;

setting, by the processor, a plurality of second candidate get-on places within a predetermined distance from the second origin, and setting a plurality of second candidate get-off places within a predetermined distance from the second destination;

generating, by the processor, a plurality of second get-on-and-off pairs by combination of the plurality of second candidate get-on places and the plurality of second candidate get-off places;

generating, by the processor, a plurality of first entire paths obtained by combination of one of the plurality of first get-on-and-off pairs and one of the plurality of second get-on-and-off pairs;

determining, by the processor, a second passenger moving time based on a pre-get-on walking time from the second origin to a second candidate get-on place, a post-get-off walking time from a second candidate get-off place to the second destination, and a vehicle travel time required for the vehicle to travel from the second candidate get-on place to the second candidate get-off place, with respect to each in the plurality of first entire paths; and determining, by the processor, a third passenger moving time based on the pre-get-on walking time from the second origin to the second candidate get-on place, the post-get-off walking time from the second candidate get-off place to the second destination, and the vehicle travel time required for the one or more other vehicles to travel from the second candidate get-on place to the second candidate get-off place, with respect to each in the plurality of first entire paths.

8. The method of claim 7, further including:

determining, by the processor, a first vehicle running time based on a cost for the vehicle to travel through the first and second candidate get-on places and the first and second candidate get-off places, with respect to each in the plurality of first entire paths;

determining, by the processor, a second vehicle running time based on a cost for the one or more other vehicles to travel through the first and second candidate get-on places and the first and second candidate get-off places, with respect to each in the plurality of first entire paths;

estimating, by the processor, a first expected demand for the entire path by summing quantities of calls for a plurality of links forming the first entire path during a running time period of the vehicle, with respect to each in the plurality of first entire paths;

estimating, by the processor, a second expected demand for the entire path by summing quantities of calls for a plurality of links forming the first entire path during a running time period of the one or more other vehicles, with respect to each in the plurality of first entire paths;

determining, by the processor, a first total travel time by subtracting a value obtained by multiplying the first expected demand by a predetermined weight value from a sum of the first passenger moving time, the second passenger moving time, and the first vehicle running time with respect to the vehicle; and determining, by the processor, a second total travel time by subtracting a value obtained by multiplying the second expected demand by the predetermined weight value from a sum of the first passenger moving time, the third passenger moving time, and the second vehicle running time with respect to the one or more other vehicles.

9. The method of claim 1, wherein the determining of the total travel time includes:

determining, by the processor, the total travel time by subtracting a result of multiplying the expected demand by a predetermined weight value from a sum of the first passenger moving time and the vehicle running time, with respect to each in the plurality of entire paths.

10. An operation server comprising:

a memory storing a program; and a processor configured to execute the program for providing a transportation service upon receiving a first destination and a first origin along with a vehicle call request from a first user terminal, wherein the processor comprises:
  an entire path generation module configured to set a plurality of first candidate get-on places within a predetermined distance from the first origin and a plurality of first candidate get-off places within a predetermined distance from the first destination and to generate a plurality of first get-on-and-off pairs by combination of the plurality of first candidate get-on places and the plurality of first candidate get-off places;

a passenger moving time calculation module configured to determine a passenger moving time based on the first origin, the first destination, and each entire path, with respect to each in a plurality of entire paths based on each in the plurality of first get-on-and-off pairs;

a vehicle running time calculation module configured to determine a vehicle running time based on each entire path, with respect to each in the plurality of entire paths;

a total travel time calculation module configured to determine a total travel time based on an expected demand, a first passenger moving time, and the vehicle running time with respect to each in the plurality of entire paths; and an expected demand calculation module configured to estimate the expected demand for the entire path by summing quantities of calls for a plurality of links forming each entire path during a running time period of a vehicle, with respect to each in the plurality of entire paths, wherein the total travel time calculation module is configured to determine the total travel time by subtracting a value based on the expected demand from a sum of the passenger moving time and the vehicle running time, and wherein the passenger moving time calculation module is further configured to determine the first passenger moving time based on a pre-get-on walking time from the first origin to a first candidate get-on place, a post-get-off walking time from a first candidate get-off place to the first destination, and a vehicle travel time required for the vehicle to travel from the first candidate get-on place to the first candidate get-off place.

11. The operation server of claim 2, wherein the vehicle running time calculation module is further configured to determine the vehicle running time by converting a running cost for a vehicle to travel through the first candidate get-on place and the first candidate get-off place to time, with respect to each in the plurality of entire paths.

12. The operation server of claim 11, wherein the total travel time calculation module is further configured to determine the total travel time by subtracting a value obtained by multiplying the expected demand by a predetermined weight value from a sum of the first passenger moving time and the vehicle running time, with respect to each in the plurality of entire paths.

13. The operation server of claim 10, further including a get-on-and-off place selection module configured to select a first candidate get-on place and a first candidate get-off place having a minimum total travel time among a plurality of total travel times for the plurality of entire paths, as a first get-on place and a first get-off place.

14. The operation server of claim 10, wherein, upon receiving a second origin and a second destination along with a vehicle call from a second user terminal:

the entire path generation module is further configured to set a plurality of second candidate get-on places within a predetermined distance from the second origin, set a plurality of second candidate get-off places within a predetermined distance from the second destination, generate a plurality of second get-on-and-off pairs by combination of the plurality of second candidate get-on places and the plurality of second candidate get-off places, and generate a plurality of first entire paths obtained by combination of one of the plurality of first get-on-and-off pairs and one of the plurality of second get-on-and-off pairs;

the passenger moving time calculation module is further configured to determine a second passenger moving time based on a pre-get-on walking time from the second origin to a second candidate get-on place, a post-get-off walking time from a second candidate get-off place to the second destination, and a vehicle travel time required for a vehicle to travel from the second candidate get-on place to the second candidate get-off place, with respect to each in the plurality of first entire paths;

the vehicle running time calculation module is further configured to determine the vehicle running time based on a cost for running between the first and second candidate get-on places and the first and second candidate get-off places, with respect to each in the plurality of first entire paths;

the expected demand calculation module is further configured to estimate the expected demand for the entire path by summing quantities of calls for a plurality of links forming the first entire path during a running time period of the vehicle, with respect to each in the plurality of first entire paths; and the total travel time calculation module is configured to determine the total travel time by subtracting a value obtained by multiplying the expected demand by a predetermined weight value from a sum of the first passenger moving time, the second passenger moving time, and the vehicle running time.

15. The operation server of claim 14, wherein, with respect to each in a plurality of entire paths based on the plurality of first get-on-and-off pairs of one or more other vehicles:

the total travel time is determined by determining the first passenger moving time, the vehicle running time, and the expected demand;

a vehicle corresponding to a minimum total travel time from among a plurality of total travel times with respect to the plurality of first get-on-and-off pairs of the vehicle and the one or more other vehicles is selected; and a first candidate get-on place and a first candidate get-off place of the minimum total travel time are selected as a first get-on place and a first get-off place.

16. The operation server of claim 15, wherein, upon receiving the second origin and the second destination along with the vehicle call from the second user terminal:

the entire path generation module is further configured to set a plurality of second candidate get-on places within a predetermined distance from the second origin, set a plurality of second candidate get-off places within a predetermined distance from the second destination, generate a plurality of second get-on-and-off pairs by combination of the plurality of second candidate get-on places and the plurality of second candidate get-off places, and generate a plurality of first entire paths obtained by combination of one of the plurality of first get-on-and-off pairs and one of the plurality of second get-on-and-off pairs; and the passenger moving time calculation module is further configured to determine a second passenger moving time based on a pre-get-on walking time from the second origin to the second candidate get-on place, a post-get-off walking time from the second candidate get-off place to the second destination, and the vehicle travel time required for the vehicle to travel from the second candidate get-on place to the second candidate get-off place, with respect to each in the plurality of first entire paths, and to determine a third passenger moving time based on the pre-get-on walking time from the second origin to the second candidate get-on place, the post-get-off walking time from the second candidate get-off place to the second destination, and the vehicle travel time required for the one or more other vehicles to travel from the second candidate get-on place to the second candidate get-off place.

17. The operation server of claim 16,
wherein the vehicle running time calculation module is further configured to determine a first vehicle running time based on a cost for the vehicle to travel through the first and second candidate get-on places and the first and second candidate get-off places, with respect to each in the plurality of first entire paths, and to determine a second vehicle running time based on a cost for the one or more other vehicles to travel through the first and second candidate get-on places and the first and second candidate get-off places;
wherein the expected demand calculation module is further configured to estimate a first expected demand for the entire path by summing quantities of calls for a plurality of links forming a first entire path during the running time period of the vehicle, with respect to each in the plurality of first entire paths, and to estimate a second expected demand for the entire path by summing quantities of calls for a plurality of links forming the first entire path during a running time period of the one or more other vehicles, with respect to each in the plurality of first entire paths; and
wherein the total travel time calculation module is further configured to determine a first total travel time by subtracting a result of multiplying the first expected demand by the predetermined weight value from a sum of the first passenger moving time, the second passenger moving time, and the first vehicle running time with respect to the vehicle, and to determine a second total travel time by subtracting a result of multiplying the second expected demand by the predetermined weight value from a sum of the first passenger moving time, the third passenger moving time, and the second vehicle running time with respect to the one or more other vehicles.

18. The operation server of claim 10, wherein the total travel time calculation module is further configured to determine the total travel time by subtracting a result of multiplying the expected demand by a predetermined weight value from a sum of the passenger moving time and the vehicle running time, with respect to each in the plurality of entire paths.

19. The operation server of claim 10, further including a database configured to store quantity of calls during a running time period of the vehicle with respect to the plurality of links.

20. A method for determining a vehicle get-on-and-off place performed by a processor of an operation server configured to execute a program stored by a memory, the method comprising:
receiving, by the operation server, a first destination and a first origin along with a vehicle call request from a first user terminal;
setting, by the processor, a plurality of first candidate get-on places within a predetermined distance from the first origin and a plurality of first candidate get-off places within a predetermined distance from the first destination;
generating, by the processor, a plurality of first get-on-and-off pairs by combination of the plurality of first candidate get-on places and the plurality of first candidate get-off places;
determining, by the processor, a first passenger moving time based on the first origin, the first destination, and each entire path, with respect to each in a plurality of entire paths based on each in the plurality of first get-on-and-off pairs;
determining, by the processor, a vehicle running time based on each entire path, with respect to each in the plurality of entire paths; and
determining, by the processor, a total travel time based on an expected demand, the first passenger moving time, and the vehicle running time with respect to each in the plurality of entire paths,
wherein the determining of the first passenger moving time, the determining of the vehicle running time, the estimating of the expected demand, and the determining of the total travel time are performed with respect to each in a plurality of entire paths based on the plurality of first get-on-and-off pairs of one or more other vehicles,
wherein the method further includes:
storing the plurality of total travel times with respect to the plurality of entire paths with respect to each in a vehicle and the one or more other vehicles in another memory;
selecting, by the processor, a vehicle corresponding to a minimum total travel time from among a plurality of total travel times with respect to the plurality of entire paths of the vehicle and the one or more other vehicles stored in another memory; and
selecting, by the processor, a first candidate get-on place and a first candidate get-off place of the minimum total travel time as a first get-on place and a first get-off place, and
wherein the determining of the first passenger moving time includes:
determining the first passenger moving time based on a pre-get-on walking time from the first origin to the first candidate get-on place, a post-get-off walking time from the first candidate get-off place to the first destination, and a vehicle travel time required for a vehicle to travel from the first candidate get-on place to the first candidate get-off place, with respect to each in the plurality of entire paths.

* * * * *